(12) United States Patent
Thibaut et al.

(10) Patent No.: US 12,355,249 B2
(45) Date of Patent: Jul. 8, 2025

(54) SYSTEMS AND METHODS FOR DISTRIBUTING ELECTRIC POWER FROM A MULTI-PHASIC POWER SOURCE TO A PLURALITY OF ELECTRONIC DEVICES

(71) Applicant: OVH, Roubaix (FR)

(72) Inventors: Christophe Maurice Thibaut, Noyelles les Seclin (FR); Miroslaw Piotr Klaba, Roubaix (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 18/237,177

(22) Filed: Aug. 23, 2023

(65) Prior Publication Data

US 2024/0072542 A1   Feb. 29, 2024

(30) Foreign Application Priority Data

Aug. 30, 2022  (EP) .................................... 22306281

(51) Int. Cl.
  *H02J 13/00*  (2006.01)
  *H02J 3/14*  (2006.01)
  *H02J 3/26*  (2006.01)

(52) U.S. Cl.
  CPC ............. *H02J 3/26* (2013.01); *H02J 2310/16* (2020.01); *H02J 2310/52* (2020.01)

(58) Field of Classification Search
  CPC ...... H02J 3/26; H02J 2310/16; H02J 2310/52; H02J 3/14; H02J 13/00036; H02J 3/06; H02J 3/007; H02J 13/00; G06F 1/26

(Continued)

(56) References Cited

U.S. PATENT DOCUMENTS

| 7,414,329 B2 | 8/2008 | Cleveland |
| 9,058,156 B2 | 6/2015 | Alshinnawi et al. |

(Continued)

FOREIGN PATENT DOCUMENTS

| CN | 107230992 A | 10/2017 |
| DE | 102019135894 A | 7/2021 |
| WO | 2017186242 A1 | 11/2017 |

OTHER PUBLICATIONS

European Search Report with regard to the European Patent Application No. 22306281.1 completed Jan. 31, 2023.

(Continued)

*Primary Examiner* — Rexford N Barnie
*Assistant Examiner* — Xuan Ly
(74) *Attorney, Agent, or Firm* — BCF LLP

(57) ABSTRACT

System and method for distributing electric power from a multi-phasic power source to electronic devices, the electric power being carried by a plurality of phases. The method comprises distributing, via a plurality of multi-way switching devices, electric power from the power source to a plurality of electronic devices, each multi-way switching device corresponding to a given electronic device and being configured to distribute a present phase thereto, accessing information about power consumption of the electronic devices, determining, based on said information, a present degree of electrical imbalance of the power source, and in response to the present degree of electrical imbalance being greater than a threshold, executing a load balancing routine including determining an adjusted phase to be distributed to at least one of the electronic devices and causing the at least one multi-way switching device to switch to an adjusted switching state.

18 Claims, 9 Drawing Sheets

(58) Field of Classification Search
USPC .......................................................... 307/14
See application file for complete search history.

(56) References Cited

U.S. PATENT DOCUMENTS

| | | |
|---|---|---|
| 9,766,278 B2 | 9/2017 | Rao et al. |
| 9,891,679 B2 | 2/2018 | Phadke et al. |
| 9,997,995 B2 | 6/2018 | Humphrey et al. |
| 10,530,161 B2 | 1/2020 | Chisenga et al. |
| 10,560,023 B2 | 2/2020 | Cheng et al. |
| 2007/0046103 A1 | 3/2007 | Belady et al. |
| 2011/0245988 A1 | 10/2011 | Ingels et al. |
| 2016/0261112 A1 | 9/2016 | Teroerde et al. |
| 2017/0149243 A1* | 5/2017 | Dozier ...................... G06F 1/26 |
| 2021/0296900 A1* | 9/2021 | Wanes ...................... H02J 3/28 |
| 2022/0013994 A1 | 1/2022 | French et al. |

OTHER PUBLICATIONS

"3 Phase PDU solutions", https://www.servertech.com/solutions/3-phase-pdu-solutions/, 16 pages.

Sajip, "Why Do We Use Three-Phase Power?" 2021, https://www.ny-engineers.com/blog/why-do-we-use-three-phase-power, Feb. 27, 2021, 8 pages.

Gupta et al., "Effects of Phase Imbalance on Data Center Energy Management", 20th Annual International Conference on High Performance Computing, 2013, https://ieeexplore.ieee.org/document/6799099, 10 pages.

English Abstract for DE102019135894 retrieved on Espacenet on Aug. 23, 2023.

English Abstract for CN107230992 retrieved on Espacenet on Aug. 23, 2023.

* cited by examiner

SYSTEMS AND METHODS FOR DISTRIBUTING ELECTRIC POWER FROM A MULTI-PHASIC POWER SOURCE TO A PLURALITY OF ELECTRONIC DEVICES

CROSS REFERENCE

The present application claims priority to EP Application No. 22306281.1, filed Aug. 30, 2022 entitled "Systems and Methods for Distributing Electrical Power from a Multi-Phasic Power Source to a Plurality of Electronic Devices", the entirety of which is incorporated herein by reference.

FIELD

The present technology relates to systems and methods for electric power distribution. In particular, systems and methods for distributing electric power from a multi-phasic power source to a plurality of electronic devices are disclosed.

BACKGROUND

A datacenter typically houses tens or hundreds of servers for load sharing and redundancy. Such large-scale server networks consume large amounts of electric power which makes electric power distribution a complex and error-prone task.

In most datacenters, servers are housed in racks and receive electric power from a power source. However, typical servers require mono-phasic electric power to operate under standard conditions, while power sources used in datacenters are usually multi-phasic power sources due to the relatively high number of servers to power. Indeed, multi-phasic power sources provide greater power density than a one-phase circuit at the same amperage, keeping wiring size and costs lower.

Needs for phase allocation and proper load balancing between the plurality of phases of a given multi-phasic power source to power the servers thus arise. Load imbalance may lead to service interruptions of one or more servers, or even loss or damaging of the servers, the power source, or both. Typical solutions for load balancing have not been found suitable for the specific context of datacenters, notably in view of inherent stringent characteristics of the electronic equipment and services provided by said electronic equipment.

Solutions for distributing electric power from a multi-phasic power source to a plurality of electronic devices with proper load balancing is thus desirable.

SUMMARY

Embodiments and examples of the present technology have been developed based on developers' appreciation of shortcomings associated with the prior art.

In a first broad aspect of the present technology, there is provided a method for distributing electric power from a multi-phasic power source to a plurality of electronic devices, the electric power being carried by a plurality of phases generated by the multi-phasic power source. The method comprises distributing, via a plurality of multi-way switching devices, electric power from the multi-phasic power source to a plurality of power outlets, each one of the plurality of electronic devices being electrically connected to a corresponding one of the plurality of power outlets, each multi-way switching device corresponding to a given electronic device and being configured to distribute a present phase among the plurality of phases to the corresponding power outlet. The method further comprises accessing, for each power outlet, power consumption data comprising information about a power consumption of an electronic device electrically connected to the power outlet, determining, based on the power consumption data, a present degree of electrical imbalance of an electrical quantity of the multi-phasic power source, the present degree of electrical imbalance being indicative of an imbalance between amounts of electric power consumed by the plurality of electronic devices on each one of the plurality of phases, and, in response to the present degree of electrical imbalance being greater than a pre-determined threshold, executing a load balancing routine. Execution of the load balancing routine comprises determining an adjusted phase to be distributed to at least one of the plurality of power outlets by at least one multi-way switching device of the plurality of multi-way switching devices, and causing the at least one multi-way switching device to switch to an adjusted switching state, thereby causing the at least one multi-way switching device to select and distribute the adjusted phase to the corresponding power outlet.

In some examples of the method, causing the at least one multi-way switching device to switch to an adjusted switching state comprises, for each of the plurality of multi-way switching devices, detecting, at a first moment in time, a first zero-cross of one of an intensity and a voltage of a first phase of the plurality of phase, the first phase being relied upon to provide electric power to the electronic device corresponding to the multi-way switching device, causing the multi-way switching device to disconnect, at the first moment in time, the corresponding one of the plurality of power outlets from the power inlet, detecting, at a second moment in time, a second zero-cross of one of an intensity and a voltage of the adjusted phase; and causing, at the second moment in time, the multi-way switching device to switch to the adjusted switching state to distribute the adjusted phase to the corresponding one of the plurality of power outlets.

In some examples of the method, causing the at least one multi-way switching device to switch to an adjusted switching state comprises, for each of the plurality of multi-way switching devices, detecting, at a first moment in time, a first zero-cross of one of an intensity and a voltage of the present phase, causing the multi-way switching device to disconnect, at the first moment in time, the corresponding power outlet from the power inlet, detecting, at a second moment in time, a second zero-cross of one of an intensity and a voltage of a transitionary phase of the plurality of phases, the second zero-cross being an immediate zero-cross of one of an intensity and a voltage of any phase of the plurality of phases consecutive to the first zero-cross and causing, at the second moment in time, the multi-way switching device to switch to a transitionary switching state to distribute the transitionary phase to the corresponding power outlet.

In some examples of the method, the method further comprises repeating the load balancing routine, and terminating the repeating the load balancing routine in response to the multi-way switching device distributing the adjusted phase to the corresponding power outlet.

In some examples of the method, a difference between the first moment in time and the second moment in time is below 16 microseconds (ms).

In some examples of the method, the method further comprises repeating the load balancing routine periodically.

In some examples of the method, a period of time between two consecutive executions of the load balancing routine is greater than a pre-determined time threshold.

In a second broad aspect of the present technology, there is provided a non-transitory computer-readable medium comprising computer-readable instructions that, upon being executed by a system, cause the system to perform the method.

In a third broad aspect of the present technology, there is provided a power distribution unit for distributing electric power from a multi-phasic power source to a plurality of electronic devices. The power distribution unit comprises a controller, a power inlet for receiving electric power from the multi-phasic power source, electric power being carried by a plurality of phases generated by the multi-phasic power source, a plurality of power outlets for distributing mono-phasic electric power to the plurality of electronic devices. Each power outlet comprises a power sensing device communicably connected to the controller, the power sensing device being configured to determine power consumption data corresponding to a power consumption of a corresponding electronic device of the plurality of electronic devices electrically connected to the power outlet and transmit said data to the controller. The power distribution unit also comprises a plurality of multi-way switching devices operatively connected between the power inlet and the plurality of power outlets, the plurality of multi-way switching devices being communicably connected to the controller, each multi-way switching device being configured to distribute a given phase of the plurality of phases to a corresponding power outlet for generating mono-phasic electric power for the corresponding power outlet. The controller is configured to execute a load balancing routine comprising determining, based on the power consumption data received from the power sensing device of each of the plurality of power outlets, a present degree of electrical imbalance of the multi-phasic power source, the present degree of electrical imbalance being indicative of an amount of electric power consumed by the plurality of electronic devices on each of the plurality of phases, determining, in response to the determined present degree of electrical imbalance being greater than a pre-determined threshold, an adjusted phase to be distributed to at least one of the plurality of power outlets by at least one corresponding multi-way switching device of the plurality of multi-way switching devices and causing the at least one multi-way switching device to switch to a corresponding adjusted switching state, thereby causing the at least one multi-way switching device to select and distribute the adjusted phase to the corresponding power outlet.

In some examples of the power distribution unit, the controller is further configured to, for each of the plurality of multi-way switching devices, detect, at a first moment in time, a first zero-cross of one of an intensity and a voltage of a first phase of the plurality of phases, the first phase being relied upon to provide electric power to the electronic device corresponding to the multi-way switching device, cause the multi-way switching device to disconnect, at the first moment in time, a corresponding one of the plurality of power outlets from the power inlet, detect, at a second moment in time, a second zero-cross of one of an intensity and a voltage of the adjusted phase and cause, at the second moment in time, the multi-way switching device to switch to the adjusted switching state to distribute the adjusted phase to the corresponding one of the plurality of power outlets.

In some examples of the power distribution unit, the controller is further configured to, for each of the plurality of multi-way switching devices, detect, at a first moment in time, a first zero-cross of one of an intensity and a voltage of a first phase of the plurality of phases, the first phase being relied upon to provide electric power to the electronic device corresponding to the multi-way switching device of the present phase, cause the multi-way switching device to disconnect, at the first moment in time, the corresponding one of the plurality of power outlets from the power inlet, detect, at a second moment in time, a second zero-cross of a transitionary phase, the second zero-cross being an immediate zero-cross of any phase of the plurality of phases consecutive to the first zero-cross and cause, at the second moment in time, the multi-way switching device to switch to a transitionary switching state to distribute the transitionary phase to the corresponding power outlet of the plurality of power outlets.

In some examples of the power distribution unit, the controller is configured to repeat an execution of the load balancing routine and end the load balancing routine in response to the given the multi-way switching device distributing the adjusted phase to the corresponding power outlet.

In some examples of the power distribution unit, the controller is configured to execute the load balancing routine periodically.

In some examples of the power distribution unit, a period of time between two consecutive executions of the load balancing routine is greater than a pre-determined time threshold.

In some examples of the power distribution unit, the power distribution unit further comprises a plurality of inlet phase sensing devices for sensing an electric power of each phase of the multi-phasic power source at the power inlet.

In some examples of the power distribution unit, the controller is configured to execute the load balancing routine in response to at least one of the plurality of inlet phase sensing devices detecting a loss of at least one phase of the multi-phasic power source.

In some examples of the power distribution unit, the power inlet is configured to receive a tri-phasic electric power from a tri-phasic power source.

In some examples of the power distribution unit, the plurality of power outlets is configured to distribute electric power to a plurality of servers of a datacenter.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a data object with respect to a particular object storage device, or some other means of directing the recipient of the indication to a network location, memory address, database table, or other location where the data object may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Embodiments and examples of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represents conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some examples of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Additional and/or alternative features, aspects and advantages of embodiments and examples of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

With these fundamentals in place, we will now consider some non-limiting examples to illustrate various implementations of aspects of the present technology.

Figure 1:
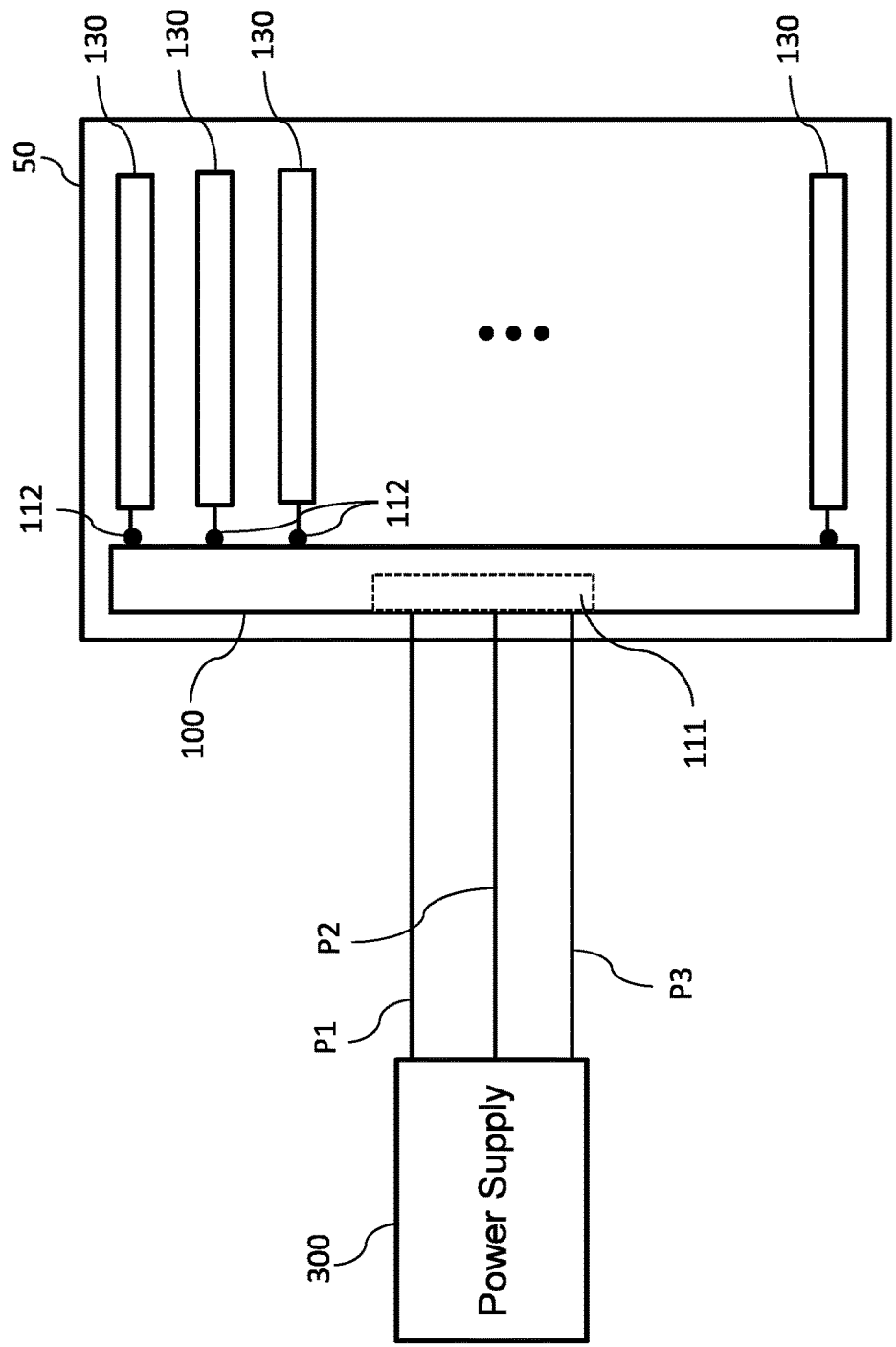
FIG. 1 is a schematic representation of electronic devices hosted in a rack in accordance with non-limiting examples of the present technology.

FIG. 1 is a schematic representation of a rack assembly 50 in accordance with an example of the present technology. The rack assembly 50 is configured for use in a data center which, in use, houses multiple ones of the rack assembly 50. Notably, the rack assembly 50 is configured to house electronic devices 130 such as servers, networking equipment, power equipment or any other suitable electronic equipment that is designed to support the function of the data center. For example, the rack assembly 50 may include a rack frame defining housing units for housing the electronic devices 130 therein. In use, multiple such rack assemblies 50 are stacked in columns themselves and aligned in rows that are spaced from one another (forming aisles there between) and extend parallel to one another.

Figure 3:
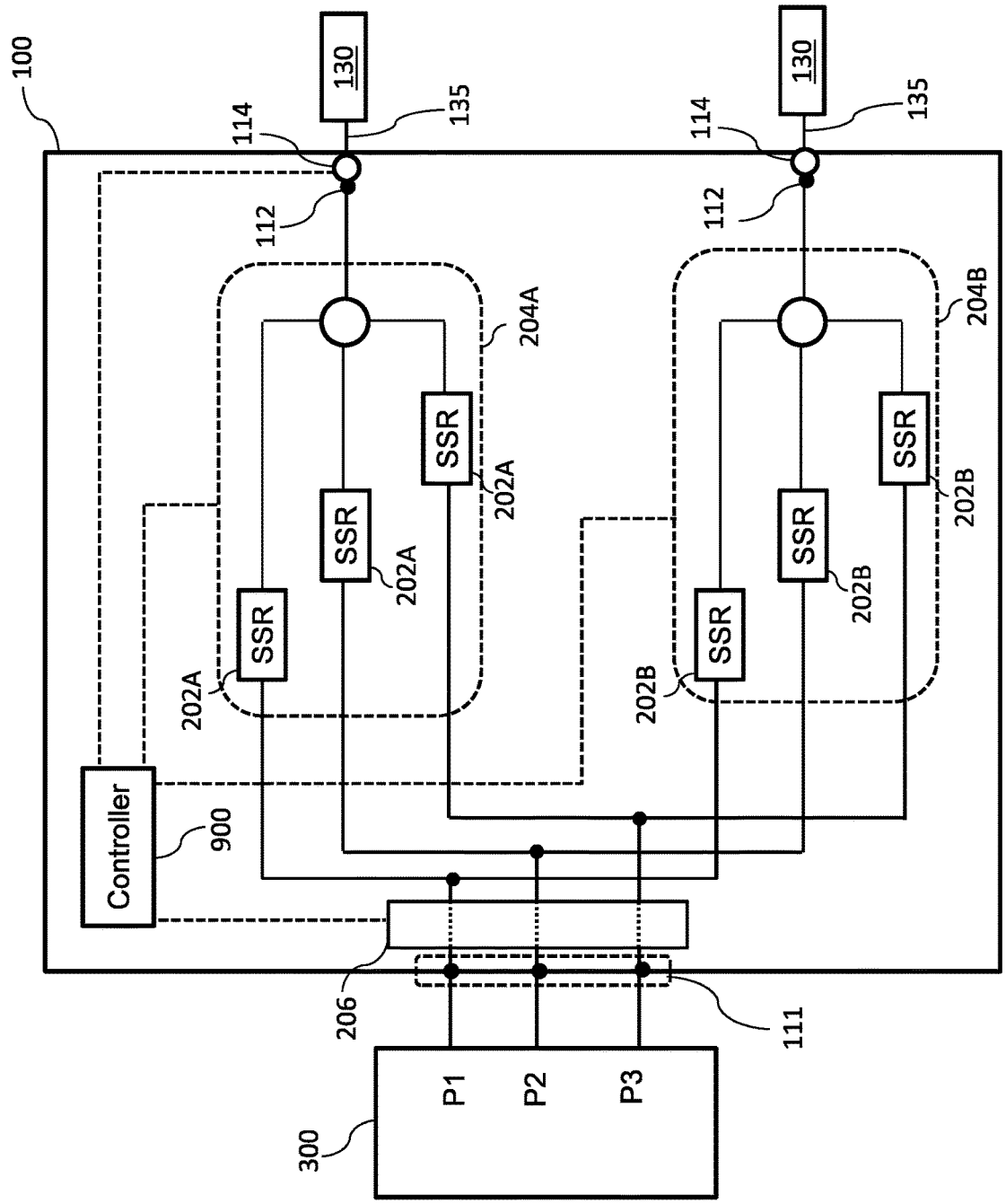
FIG. 3 is a schematic representation of a power distribution unit for distributing electric power to the electronic devices of FIG. 1 in accordance with non-limiting examples of the present technology.

As illustrated schematically in FIG. 1, the rack assembly 50 includes a power distribution unit (PDU) 100 electrically connected to a power source 300, and to a plurality of electronic devices 130. The PDU 100 is schematically illustrated in FIG. 3 and will be described in greater detail below. A given rack system 50 may include a plurality of PDUs 100. More specifically, the PDU 100 includes a power inlet 111 for receiving electric power from the power source 300. The power inlet 111 may be, for example and without limitation, a CEE 7-type plug for use in European countries or a National Electrical Manufacturers Association (NEMA) 5-type plug for use in North American countries. In this example, the power source 300 is a multi-phasic power source, the electric power delivered by the power source 300 being carried by a plurality of phases generated by the power source 300. In the illustrative example of FIG. 1, the power source 300 is a tri-phasic power source, the electric power being carried by a first phase P1, a second phase P2 and a third phase P3. Even though those three phases are depicted as separate power lines, or "phase conductors" in FIG. 1, it should be understood that a same power line or a same cable may carry the three phases P1, P2 and P3 of the electric power. A same power source 300 may be used to provide electric power to a plurality of PDUs 100 of a same or different rack system 50.

The PDU 100 further includes a plurality of power outlets 112 for providing electric power to electronic devices 130 connected thereto. The power outlets 112 may be, for example and without limitations, C13-type plugs. In some examples, each PDU 100 includes eight (8) power outlets 112. Apportionment of the electric power and the phases thereof is described in greater detail herein after. In this example, each electronic device 130 is electrically connected to a corresponding one of the electric outlets 112 of the PDU 100. Furthermore, in this example, the PDU 100 distributes mono-phasic electric power to the electronic device 130. A plurality of the electronic devices 130 may receive a same phase (e.g. P2) from the PDU 100.

As will be described in greater detail herein after, a degree of electrical imbalance of an electrical quantity of the power source 300 is determined by the PDU 100. The PDU 100 further distributes adjusted phases among the plurality of phases to the electronic devices 130 in order to reduce said degree of electrical imbalance.

In some examples, the power source provides electric power to a plurality of PDUs 100, and each PDU 100 may be selectively electrically connected to a second multi-phasic power source that may be similar to the power source 300. If determination is made, by the PDU 100 or another device communicably connected thereto, that a demand for electric power from the power source 300 is above a pre-determined demand threshold, the PDU 100 performs an electrical load-shedding procedure. To do so, the PDU 100 is disconnected from the power source 300 and electrically connected to the second power source to receive electric power therefrom. This permits thereby shedding loads across multiple power sources and reducing risks of damaging and/or service interruption of the power source 300 and PDUs 100 receiving electric power therefrom.

Figure 2:
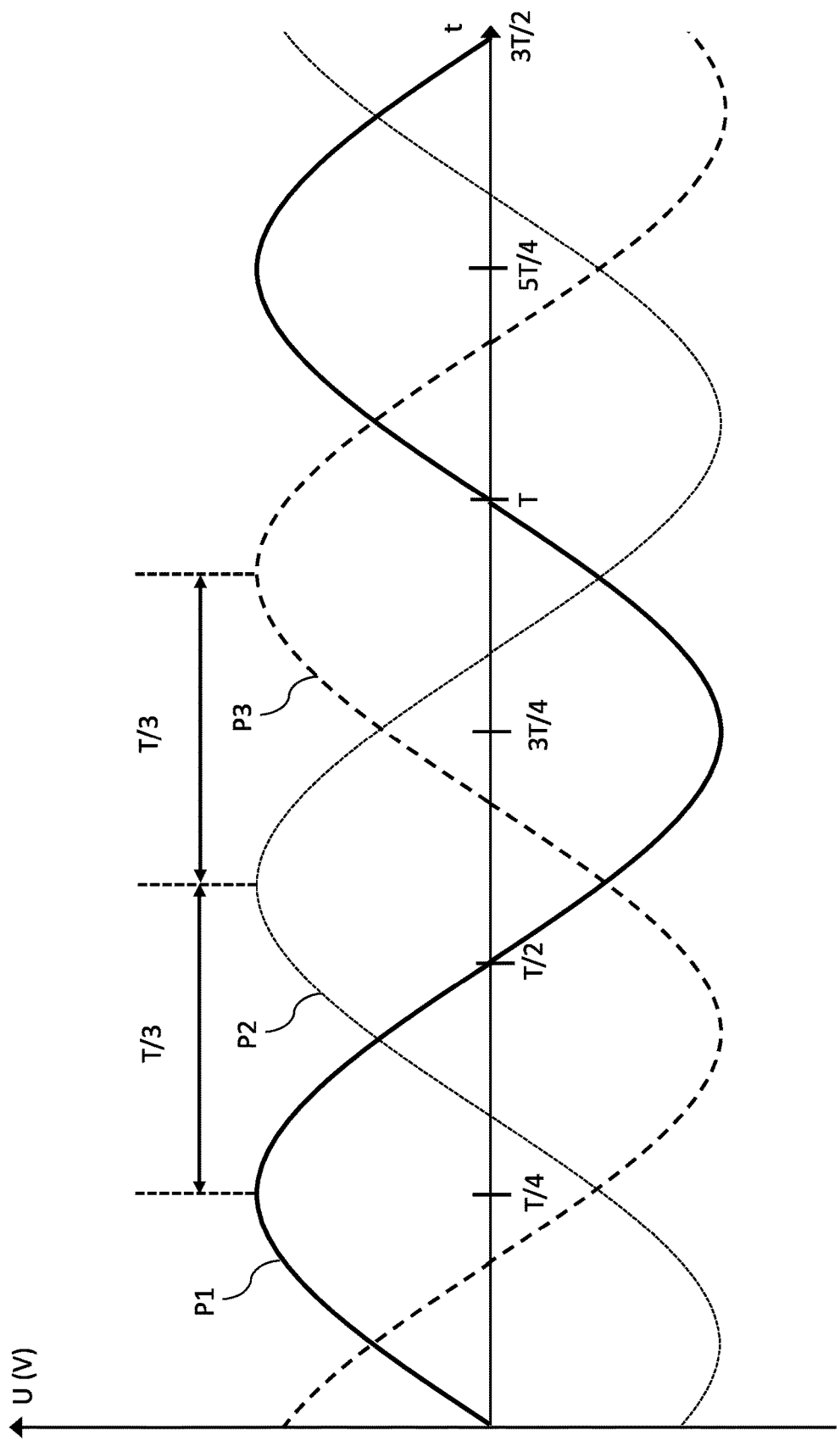
FIG. 2 is a representation of a multi-phasic signal in accordance with non-limiting examples of the present technology.

FIG. 2 is a representation of a temporal evolution of one multi-phasic signal generated by the power source 300. In this example, electric power generated by the power source 300 includes three phases P1, P2, and P3. For example, the power source 300 may be a 60 A power source where each phase carries 20 A. It is assumed that the power source 300 is balanced, namely that three conductors each carry an alternating current of the same frequency and voltage relative to a common reference, but with a phase difference of one third the period. The three currents have the same amplitude, frequency and shape, but are temporally shifted from one another. An angular shift between two consecutive phases is $\pi/3$, which corresponds to a temporal shift between two consecutive currents of T/3 where T is the period of the currents, such that the electric power supplied by the power source 300 remains temporally consistent. It should be noted that FIGS. 2 and 4 to 7 illustrates temporal evolution of an electric voltage (U(V)) provided by the power source 300. However, the same graphs could be illustrated showing temporal evolutions of an electric intensity of the signal provided by the power source 300 and the same reasoning as described herein also applies to said electric intensity.

With a perfectly balanced three-phase power source 300, the instantaneous intensity of any phase should be exactly equal in magnitude to the sum of the other two phases and of an opposed sign. As such, in response to a degree of electrical imbalance being near zero, a return path for the current in any phase conductor is the two other phase conductors. As a result, a sum of the voltages of the three phases of the multi-phasic signal shown on FIG. 2 is always zero. Further, the current of each phase is inversely equal to the sum of the currents in the two other phases. Thus, each phase conductor may act as a return path for currents from the other two phase conductors. Broadly speaking, the sum of the voltages of the phases of the power source 300 is zero while the sum of the intensities of said phases may be non-null in case of an imbalance multiphasic power source 300. In some embodiments, the power source 300 includes three mono-phasic power supplies, each mono-phasic generating one of the phases P1, P2, P3 of the current, and a fourth wire, also referred to as a "neutral wire". The neutral wire may be used by the power source 300 to allow the three separate mono-phasic supplies to operate at a constant voltage.

Referring to FIG. 3, there is shown a schematic diagram of the PDU 100, the PDU 100 being suitable for implementing non-limiting examples of the present technology. It is to be expressly understood that the PDU 100 as depicted is merely an illustrative example of the present technology. Thus, the description thereof that follows is intended to be only a description of illustrative examples of the present technology. This description is not intended to define the scope or set forth the bounds of the present technology. In some cases, what are believed to be helpful examples of modifications to the PDU 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the PDU 100 may provide in certain instances simple examples of the present technology, and that where such is the case they have been presented in this manner as an aid to understanding. As persons skilled in the art would understand, various examples of the present technology may be of a greater complexity. Generally speaking, the PDU 100 is configured to distribute electric power from the multi-phasic power source 300 to a plurality of electronic devices 130 while optimizing a degree of electrical imbalance between the different phases of the electric current provided by the power source 300.

With reference to FIGS. 1 and 3, the PDU 100 receives the three phases P1, P2 and P3 at the power inlet 111 and includes a plurality of multi-way switching devices 204A, 204B for distributing mono-phasic electric power to each of the electronic devices electrically connected to the power outlets 112 of the PDU 100. As such, any system variation configured to distribute mono-phase electric power or current to electronic devices from a multi-phasic power source can be adapted to execute examples of the present technology, once teachings presented herein are appreciated. Furthermore, the PDU 100 is described as implemented in a rack of a datacenter for providing electric power to servers of the datacenter housed in said rack. However, examples of the present technology can be equally applied to other types of the power distribution systems and for other purposes, other than electric power distribution in a datacenter.

In one example, the electronic devices 130 are servers that may be implemented as conventional computer servers. In an example of an example of the present technology, each of the servers may be implemented as a Dell™ PowerEdge™ Server running the Microsoft™ Windows Server™ operating system. Needless to say, each server may be implemented in any other suitable hardware and/or firmware, or a combination thereof. In alternative examples, the electronic devices 130 may be networking devices, antennas, display devices, or any other types of electrical loads that may operate by receiving mono-phasic electric power.

As best shown on FIG. 3, the PDU 100 further includes a sensor assembly 206 for determining operational parameters of the incoming multi-phasic power signal received from the power source 300 at the power inlet 111, a plurality of multi-way switching devices 204A, 204B, and a controller 900.

In this example, the sensor assembly 206 includes an ammeter and a voltmeter for each of the phase conductors. As such, the sensor assembly 206 provides data to the controller including information about operational parameters (e.g. frequency, amplitude, offsets) of each phase P1, P2 and P3.

In use, the multi-way switching devices 202A, 202B selectively connect a corresponding one or more power outlets 112 with a given phase of the power source 300. For example, the multi-way switching devices 202A may electrically connect any one of the phases of the power source 300 to a single electronic device 130, and the multi-way switching devices 202B may electrically connect any one of the phases of the power source 300 to another electronic device 130. To do so, each multi-way switching device includes as many switching devices 202A, 202B as there are phases received by the PDU 100. As such, in the present example the multi-way switching devices 204A and 204B include three switching devices 202A and three switching devices 202B respectively, each switching device 204A, 204B being associated with a given phase of the power source 300. It is contemplated that two or more electronic devices 130 may receive electric power from a same power outlet 112 in at least some examples.

In this example, the switching devices 202A, 202B are Solid State Relays (SSR) that are selectively actuated in an open configuration or a closed configuration by the controller 900 to respectively disconnect and connect the corresponding one or more power outlets 112 to the phase. Open or closed configurations of the switching devices 202A, 202B at a given time of a multi-way switching device 204A, 204B define a switching state of the multi-way switching device 204A, 204B at said given time. The switching state may thus be adjusted by actuating one or more switching devices 202A, 202B to a different configuration.

More specifically, in use, the controller 900 actuates two of the three switching devices 202A, 202B of each of the multi-way switching devices 202A, 202B in the open configuration, and one of the three switching devices 202A, 202B in the close configuration, to connect the corresponding one or more power outlets 112 to a given phase. Broadly speaking, for a given multi-way switching device, only one of the switching devices thereof is maintained in the close configuration while the others are maintained in the open configuration in order to connect the one or more power outlets 112 to a single phase associated with the closed switching device.

It should be noted that, in alternative examples, the power source 300 may include a higher number of phases (e.g. 4 or 5). In such alternative examples, the multi-way switching devices may have a different number of switching devices for receiving any number of phases. Moreover, even though the PDU 100 as illustrated on FIG. 3 includes two multi-way switching devices 204A, 204B, the PDU 100 may include a different number of multi-way switching devices in alternative examples.

In this example, the controller 900 further accesses, for each power outlet 112, power consumption data including information about a power consumption of an electronic device 130 electrically connected to the power outlet 112.

To do so, each power outlet 112 includes a power sensing device 114 communicably connected to the controller 900 (only a communication line between the power sensing device 114 of the power outlet 112 of the multi-way switching device 204A is depicted for clarity of FIG. 3), the power sensing device 114 being configured to determine power consumption data corresponding to a power consumption of a corresponding electronic device 130 electrically connected to the power outlet and transmit said data to the controller 900. For example, the power sensing device 114 may measure a load current flowing from the corresponding power outlet 112 toward the electronic device 130 (or any load) connected thereto. The power sensing device 114 may also measure the neutral current returning from the electronic device 130 to the power outlet 112. To do so, the power sensing device 114 may include, for example and without limitation, a voltmeter, an ammeter, a power meter, and/or a combination thereof. In this example, the power sensing device 114 provides measured power or current values to the controller 900. In some other examples, the power sensing devices 114 could be implemented in the electronic devices 130 and be communicably (and remotely) connected to the controller 900.

Based on the power consumption data for each power outlet 112 of the PDU 100, and present switching states of the multi-way switching devices 204A, 204B indicative of which phase is provided to which electronic devices 130, the controller 900 further determines a present degree of electrical imbalance of an electrical quantity of the multi-phasic power source 300. The present degree of electrical imbalance is indicative of an imbalance between amounts of electric power consumed by the plurality of electronic devices on each of the plurality of phases P1, P2 and P3. For example, if the switching state of each multi-way switching device of the PDU 100 is such that the same phase (e.g. P1) of the electric current is distributed to each electronic device 130, the degree of electrical imbalance will be relatively high. Distributing the same phase to all the electronic devices 130 may not even be possible depending on the number of electronic devices 130. For example, if P1 carries 20 A and that each electronic device 130 requires 5 A to operate, only four electronic devices 130 would suitably operate. In some examples, data provided by the sensor assembly 206 to the controller 900 is also used for determining the present degree of electrical imbalance.

In the same or another example, the power source 300 provides electric power to a plurality of PDUs 100. Phases of the power source 300 are thus distributed among the plurality of PDUs 100. The PDU 100 may receive data including information about the present degree of electrical imbalance from a remote device communicably connected thereto, said remote device being suitable for determining distribution and usage of the phases of the power source 300 by the plurality of PDUs 100 and corresponding electronic devices 130. The present degree of electric imbalance is thus a global scale degree of electric imbalance, as it takes into account imbalance due to distribution of electric power among the plurality of PDUs 100 that may be implemented in a plurality of distinct racks of the datacenter.

Broadly speaking, the imbalance may also be referred to as asymmetry. By balancing phases of the power source 300, the controller 900 may provide lowered or even minimized return electric current returning from the electronic devices 130 to the power source 300. The return electric current may be null in case of perfect balancing (i.e. perfect symmetry) between all phases.

In this example, the controller 900 repeatedly determines the present degree of electrical imbalance and executes a load balancing routine in response to the present degree of electrical imbalance being greater than a pre-determined threshold. As an example, if too many electronic devices are electrically powered by a same phase, the degree of electrical imbalance may be greater than said pre-determined threshold. For example, the pre-determined threshold may be reached in response to 250 A being received, from a same phase, by electronic devices 130 of a same rack or group of racks. As another example, the pre-determined threshold may be reached in response to 630 A being received, from a same phase, by electronic devices 130 of a group of racks.

Upon executing a load balancing routine, the controller 900 determines, based on the present degree of electrical imbalance, the power consumption data, and the current switching state of the multi-way switching devices 204A, 204B, an adjusted switching state for each multi-way switching devices 204A, 204B. In other words, the controller 900 determines, for each electronic device 130 being powered using a present phase among the plurality of phases, an adjusted phase to be distributed to said electronic device 130. The controller 900 further actuates the switching devices 202A, 202B of the multi-way switching devices 204A, 204B to cause the multi-way switching devices 204A, 204B to switch to an adjusted switching state such that the adjusted phases are distributed to the corresponding electronic devices 130.

For clarity, an "adjusted phase" is used in the context of the present disclosure in relation with a corresponding electronic device and/or a multi-way switching device. The electronic device may receive a first phase of the plurality of phases at a first moment in time, and a second phase of the plurality of phases at a second moment in time. The second phase is called an "adjusted phase" due to expected decrease of the degree of electrical imbalance in response to the electronic device receiving the second phase instead of the first phase. In a similar manner, a multi-way switching device may be in a first switching state at a first moment in time, thereby delivering a first phase to a corresponding electronic device, and in a second switching state at a second moment in time, thereby delivering a second phase to the corresponding electronic device. The second switching state may be referred to an "adjusted switching state" due to expected decrease of the degree of electrical imbalance in response to the electronic device receiving the second phase instead of the first phase. It should not be understood that an adjusted phase is a phase of the power source on which modification has been applied (e.g. modulation or filtering) but rather a selection of the phase that provided to an electronic device in order to reduce the degree of electrical imbalance.

For example, a given first electronic device 130 may receive the phase P1, a given second electronic device 130 may receive the phase P2, and a given third electronic device 130 may also receive the phase P2. Upon determining that the present degree of electrical imbalance is greater than the pre-determined threshold, the controller 900 may determine that an adjusted phase for the third electronic device 130 is the phase P3. In response, the controller 900 determines an adjusted switching state for the multi-way switching device corresponding to the third electronic device 130 and actuates the switching devices thereof such that the phase P3 is provided to the third electronic device 130.

It should be noted that, for a given electronic device receiving a given phase when the multi-way switching devices are in a given switching state, the electronic device may still receive the same given phase subsequent to the multi-way switching devices being switched to the adjusted switching state.

Broadly speaking, in response to determining that the present degree of electrical imbalance is greater than the pre-determined threshold, the controller 900 determines, for each electronic device 130, an adjusted phase to be distributed thereto in order to at least reduce the degree of electrical imbalance. The controller 900 thus estimates an adjusted, or "expected", degree of electrical imbalance. For a given electronic device 130 the adjusted phase may be the same as the present phase that is already distributed thereto. The controller 900 further determines adjusted switching states of the multi-way switching devices 204A, 204B that would, upon being applied, cause the PDU 100 to distribute the adjusted phases to the corresponding electronic devices 130. The controller 900 further causes the multi-way switching devices 204A, 204B to switch to their adjusted state, the degree of electrical imbalance being thus expected to reach the adjusted degree of electrical imbalance.

In some examples, the controller 900 periodically executes load phase balancing to minimize the degree of electrical imbalance at any time. In other words, the controller 900 may periodically cause the multi-way switching devices 204A, 204B to switch to a new adjusted switching state that is determined at each execution of the load balancing routine until the adjusted degree of electrical imbalance provides no improved imbalance than the present degree of electrical imbalance or until the present degree of electrical imbalance is below the pre-determined threshold.

Figure 4:
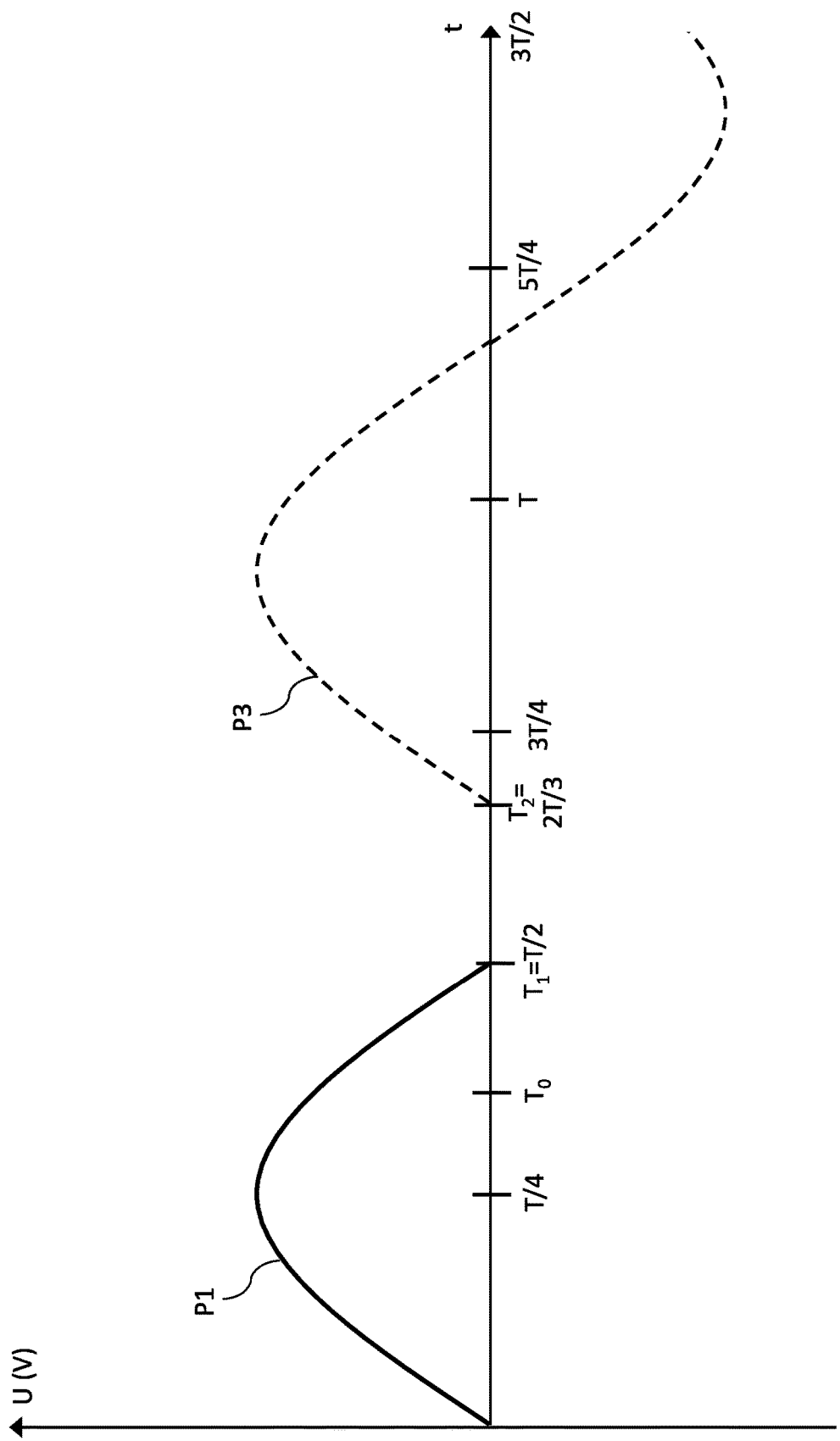
FIG. 4 is a representation of a temporal evolution of a power signal received by an electronic device in accordance with non-limiting examples of the present technology.

FIG. 4 illustrates one example of temporal evolution of phases delivered to a same electronic device 130 during an execution of load balancing routine by the controller 900. In this example, the electronic device 130 receives phase P1 to operate. At a first moment in time noted $T_0$, the controller 900 executes a load balancing routine and determines that the present degree of electrical imbalance is greater than the pre-determined threshold. In this example, the controller 900 also determines that, in order for the degree of electrical imbalance to reach the adjusted degree of electrical imbalance, the adjusted phase for the electronic device 130 is P3 (or any phase other than P1).

In this example, the controller 900 detects, at a second moment in time noted $T_1$, a first zero-cross of an intensity or a voltage of the present phase of the electronic device 130 (i.e. P1). To do so, the controller 900 may rely on the sensor assembly 206. It should be noted that, in the context of the present disclosure, a zero-cross of the intensity or the voltage should be understood as "a zero-cross of one of the intensity or the voltage", and that the selected value among the intensity and the voltage is used for all subsequent mentions of "zero-cross". In this example, the zero-crosses of the voltage are identified. The zero-crosses of the intensity may be relied upon in alternative examples, this aspect is not limitative.

In this example, the first zero-cross is the first moment in time when a zero-cross of a voltage or an intensity of the present phase occurs after the first moment $T_0$. The controller 900 further causes the multi-way switching device 202A, 202B corresponding to the electronic device 130 to disconnect, at the second moment in time (i.e. at $T_1$), the corresponding of power outlet 112 from the power inlet 111. Such disconnection of the electronic device 130 at the zero-cross aids in increasing safety for the electronic device 130. Indeed, disconnection at the zero-cross of the intensity or the voltage ensures that the electric power, which is the product of the intensity and the voltage, is null or near zero when said disconnection occurs, which enables the PDU 100 to handle relatively high amount of electric power without jeopardizing safety of the components thereof.

It should be noted that, in this example, the electronic device 130 is one of the aforementioned servers. The electronic device 130 is generally configured to stay disconnected from the power source 300 during a given period of time while still providing the services it is designed for (i.e. with no service interruption). Said period of time depends on hardware characteristics of the server and may be referred to an "offline service time span". In this example, the electronic device 130 is a server having an offline service time span of 16 ms. For example, in cases where internal components of the server are powered according to the ATX specification (e.g. receiving electric power from an ATX power supply, said ATX power supply being itself powered by the power source 300), it can be said that a minimum "Hold-Up Time" of the ATX power supply is 16 ms.

The controller 900 further detects, at a third moment in time denoted $T_2$, a second zero-cross of an intensity or a voltage of the adjusted phase (i.e. P3 in this example) and causes, at the third moment $T_2$, the multi-way switching device to switch to the adjusted switching state to distribute the phase P3 to the electronic device 130. It can thus be said that, in some examples, the switching of phases for a given electronic device is not instantly performed or is performed with a time delay. Indeed, the controller 900 may use zero-crosses of the intensity or voltage of the phases to further disconnect from and connect to a given phase of the power source 300. In this example, a time difference between $T_1$ and $T_2$ is below the offline service time span.

Figure 5:
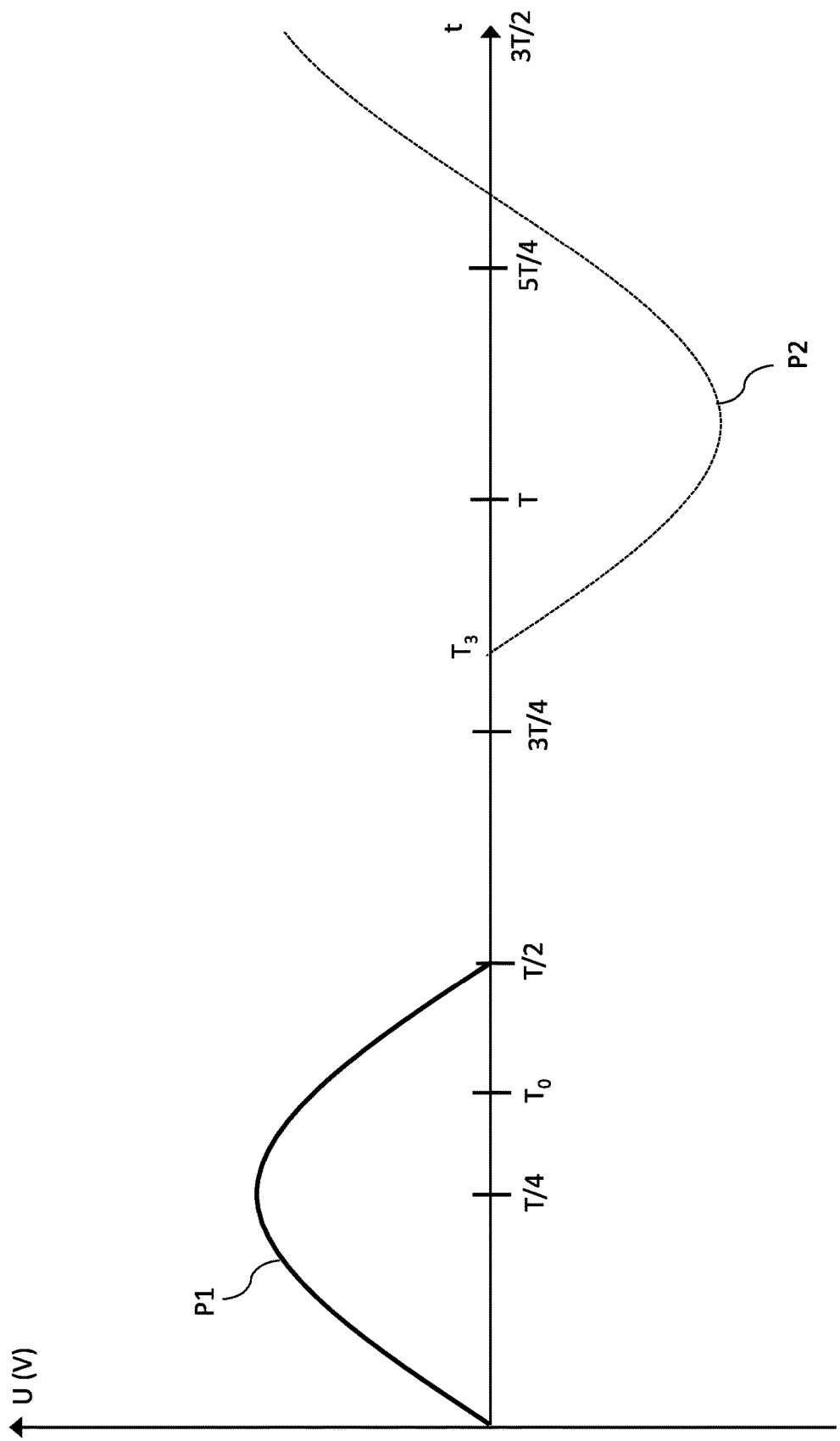
FIG. 5 is a representation of another temporal evolution of a power signal received by an electronic device in accordance with non-limiting examples of the present technology.

FIG. 5 illustrates another example of temporal evolution of phases delivered to a same electronic device 130 during an execution of load balancing routine by the controller 900. In this example, the electronic device 130 is initially provided with the phase P1 to operate. At the first moment $T_0$, the controller 900 executes a load balancing routine and determines that the present degree of electrical imbalance is greater than the pre-determined threshold. In this example, the controller 900 also determines that, in order for the degree of electrical imbalance to reach the adjusted degree of electrical imbalance, the adjusted phase for the electronic device 130 is P3.

In this example, the controller 900 detects the first zero-cross of an intensity or a voltage of the present phase of the electronic device 130 at $T_1$ (i.e. P1). The controller 900 further causes the multi-way switching device 204A, 204B corresponding to the electronic device 130 to disconnect, at $T_1$, the corresponding of power outlet 112 from the power inlet 111.

However, for any given reason such as communication delays being too long between the controller 900 of the multi-way switching device 204A, 204B, the connection of the electronic device 130 to the adjusted phase may not occur once the electronic device 130 is disconnected from the power source 300. In this scenario, the controller 900 determines the immediate next zero-cross of an intensity or a voltage of any phase. The phase that has the immediate next zero-cross of its intensity or its voltage is thus identified as a new adjusted phase. The controller 900 causes the multi-way switching device 204A, 204B to switch to a new adjusted phase to provide the electronic device 130 with the new adjusted phase. This enables the electronic device 130 not to stay disconnected from the power source 300 during a period of time that is higher than the offline service time span.

In the illustrated example, the controller 900 further detects, at a fourth moment in time denoted $T_3$, a third zero-cross of an intensity or a voltage of the adjusted phase (i.e. P2 in this example) and causes, at the fourth moment $T_3$, the multi-way switching device to switch to the adjusted switching state to distribute the adjusted phase P2 to the electronic device 130.

Figure 6:
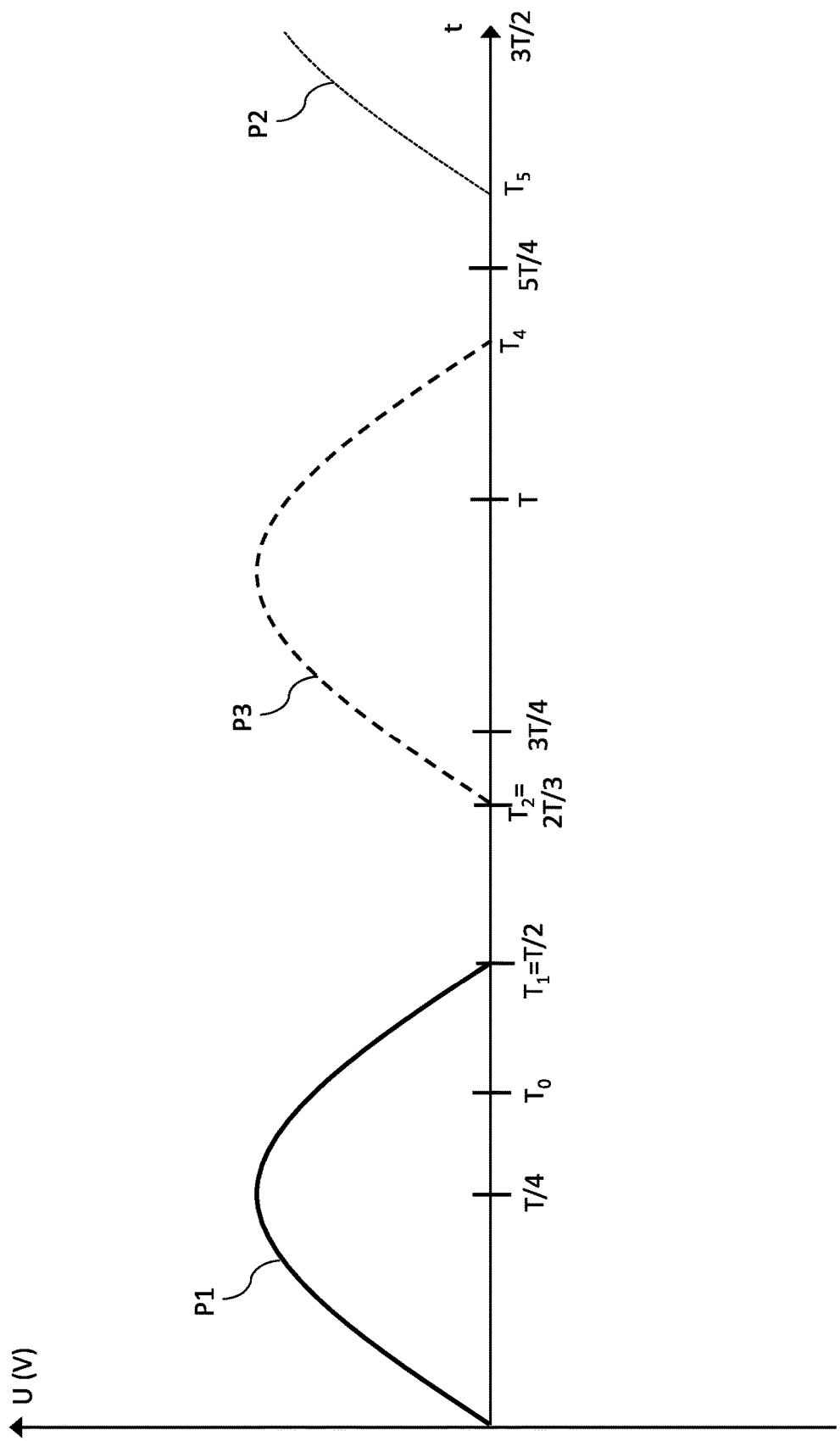
FIG. 6 is a representation of yet another temporal evolution of a power signal received by an electronic device in accordance with non-limiting examples of the present technology.

FIG. 6 illustrates another example of temporal evolution of phases delivered to a same electronic device 130 during an execution of load balancing routine by the controller 900. In this example, the electronic device 130 initially receives phase P1 to operate. At the first moment $T_0$, the controller 900 executes a load balancing routine and determines that the present degree of electrical imbalance is greater than the pre-determined threshold. In this example, the controller 900 also determines that, in order for the degree of electrical imbalance to reach the adjusted degree of electrical imbalance, the adjusted phase for the electronic device 130 is P2.

Unlike the illustrative example of FIG. 5, it is assumed that, in this example, the offline service time span of the electronic device 130 is shorter than the time difference between $T_1$ and $T_3$. As such, the operations performed by the controller 900 in the description of FIG. 5 may not be suitable to connect the electronic device 130 to the adjusted phase P2, in order to avoid exceeding the offline service time span. Indeed, the electronic device 130 would be disconnected from the power source 300 for too long and service interruptions may occur.

In this example, the controller 900 detects the first zero-cross of an intensity or a voltage of the present phase of the electronic device 130 at $T_1$ (i.e. P1). The controller 900 further causes the multi-way switching device 204A, 204B corresponding to the electronic device 130 to disconnect, at $T_1$, the corresponding of power outlet 112 from the power inlet 111.

In this example, the controller 900 further detects a zero-cross of an intensity or a voltage of any phase that will be used as a transitionary phase. In other words, the electronic device 130 will be provided with any phase that is different from the present phase to reduce a period of time during which the electronic device 130 will be disconnected before being provided with the preferred adjusted phase (i.e. P2 in this example). As such, the controller 900 causes the multi-way switching device to provide the electronic device 130 with P3 at $T_2$ (i.e. a zero-cross of intensity or voltage of P3).

In this example, the controller 900 further detects the second zero-cross of the intensity or the voltage of the transitionary phase P3 of the electronic device 130 at a fifth moment $T_4$. The controller 900 further causes the multi-way switching device 204A, 204B corresponding to the electronic device 130 to disconnect, at $T_4$, the corresponding of power outlet 112 from the power inlet 111. The controller 900 then detects at a sixth moment $T_5$ a zero-cross the intensity or voltage of P2 and causes the multi-way switching device to provide P2 at $T_5$.

In a more general aspect, the controller 900 may cause the multi-way switching device to provide each phase to the electronic device 130 in a consecutive manner until the adjusted phase is provided to the electronic device 130. More specifically, the controller 900 may cause the electronic device 130 to be disconnected from a present phase at a given moment in time and be further connected with any phase whose intensity or voltage reaches zero immediately after said moment in time. This operation may be repeated until the preferred adjusted phase is provided to the electronic device 130.

It should be noted that some electronic devices 130 may be connected to a same phase for at least a pre-determined duration of time. Indeed, upon being receiving a new phase, the electronic device 130 remains powered with said new phase for a certain period of time before being further disconnected and receiving another new phase. This may be due, for example, to a time of charge of capacitors that may be included in the electronic device 130 and that may have to be fully or partially recharged before being further electrically disconnected. The minimal duration of time between two consecutive disconnection of the electronic device 130 from the power source 300 may be referred to as a "loading time". In this example, the electronic device 130 is a server whose loading time is between 30 ms and 50 ms.

Figure 7:
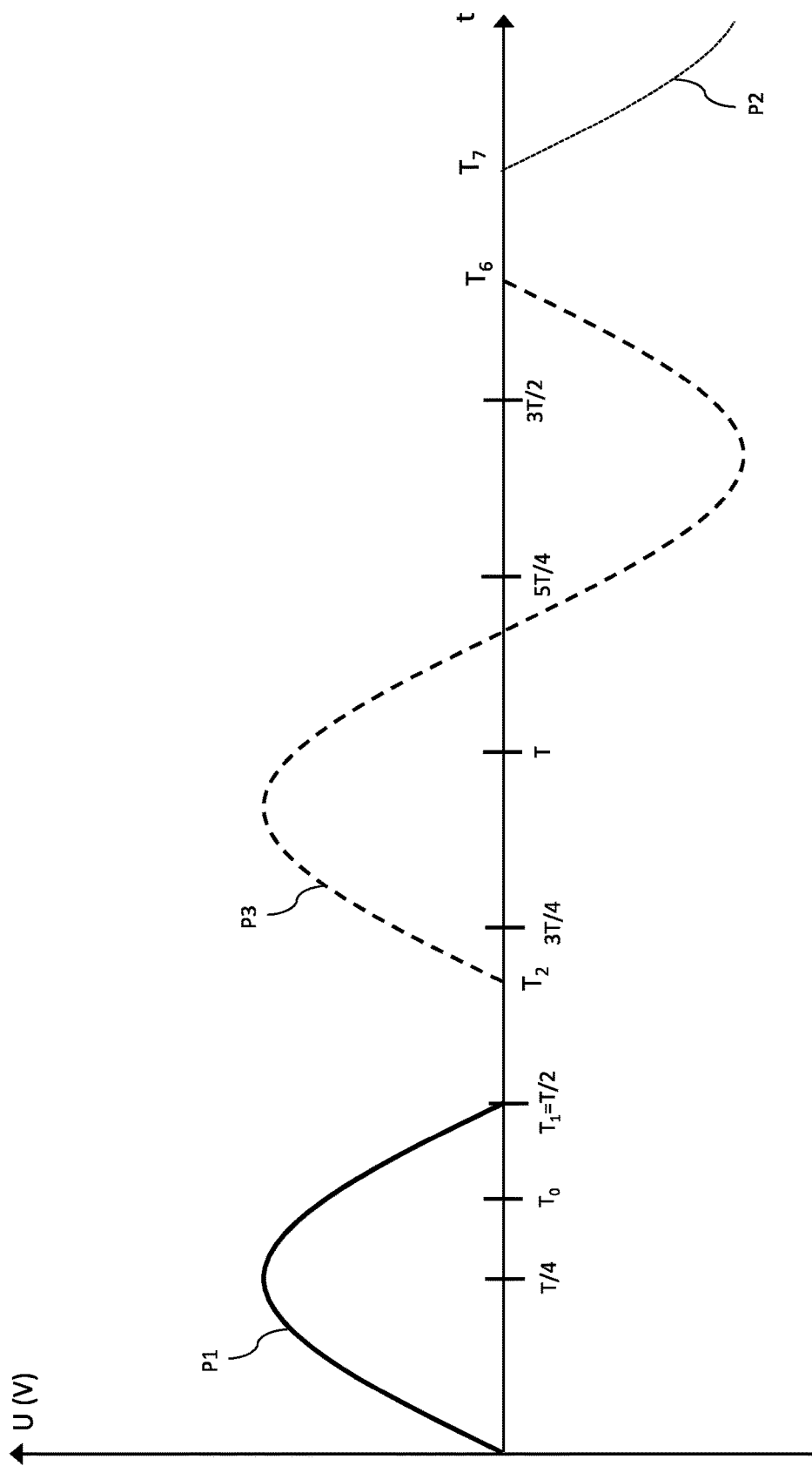
FIG. 7 is a representation of yet another temporal evolution of a power signal received by an electronic device in accordance with non-limiting examples of the present technology.

FIG. 7 illustrates another example of temporal evolution of phases delivered to a same electronic device 130 during an execution of load balancing routine by the controller 900. In this example, the electronic device 130 receives phase P1 to operate. At the first moment $T_0$, the controller 900 executes a load balancing routine and determines that the present degree of electrical imbalance is greater than the pre-determined threshold. In this example, the controller 900 also determines that, in order for the degree of electrical imbalance to reach the adjusted degree of electrical imbalance, the adjusted phase for the electronic device 130 is P2.

In this example, as described in the previous example of FIG. 6, the controller 900 detects the first zero-cross of an intensity or a voltage of the present phase of the electronic device 130 at $T_1$ (i.e. P1). The controller 900 further causes the multi-way switching device 204A, 204B corresponding to the electronic device 130 to disconnect, at $T_1$, the corresponding of power outlet 112 from the power inlet 111. The controller 900 further detects a zero-cross of an intensity or a voltage of P3 that will be used as a transitionary phase.

However, unlike the illustrative example of FIG. 6, it is assumed that, in this example, the loading time of the electronic device 130 is higher than the time difference between $T_2$ and $T_4$. As such, the operations performed by the controller 900 in the description of FIG. 5 may not be suitable to connect the electronic device 130 to the adjusted phase P2. Indeed, the electronic device 130 would be disconnected from the power source 300 too soon such that service interruptions may occur.

In the example of FIG. 7, the controller 900 further waits until the electronic device 130 has been provided with the transitionary phase for at least a time duration equal to the loading time. For example, the controller 900 may trigger a counter (not shown) indicative of a time that elapsed since the electronic device 130 has been started to be provided with the transitionary phase. Once the counter has reached a pre-determined time duration (e.g. equal to the loading time) the controller 900 may further detect a zero-cross of the intensity or the voltage of the transitionary phase P3 of the electronic device 130 at a seventh moment $T_6$. The controller 900 further causes the multi-way switching device corresponding to the electronic device 130 to disconnect, at $T_6$, the corresponding of power outlet 112 from the power inlet 111. The controller 900 then detects at an eighth moment $T_7$ a zero-cross the intensity or voltage of P2 and causes the multi-way switching device to provide P2 at $T_7$.

It is contemplated that the controller 900 may cause the multi-way switching device to provide the electronic device 130 with another transitionary phase (i.e. different from P2) at $T_7$, and repeat the described operation until the electronic device 130 is provided with P2.

Figure 8:
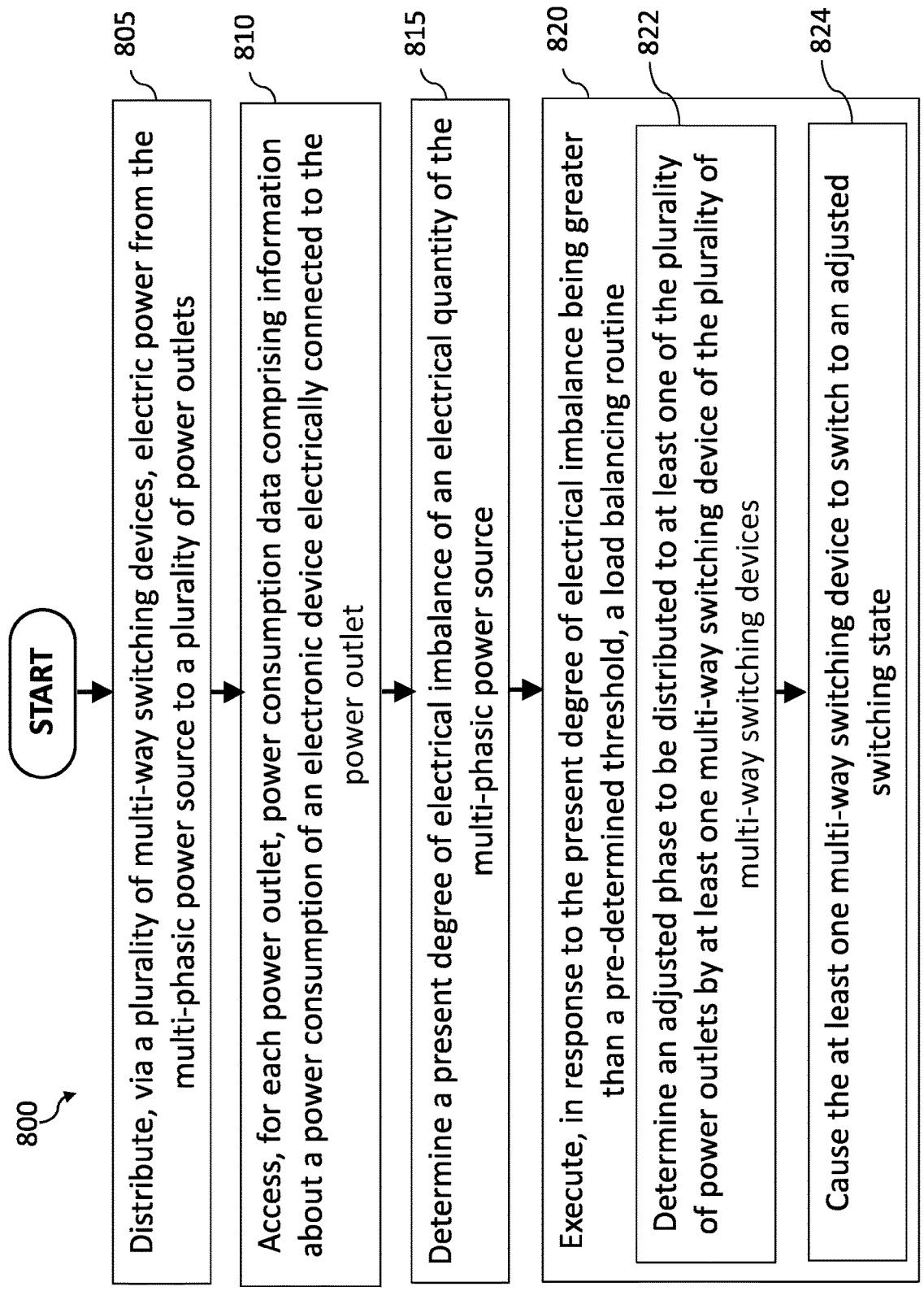
FIG. 8 illustrates a flow diagram showing operations of a method for distributing electric power from a multi-phasic power source to a plurality of electronic devices in accordance with non-limiting examples of the present technology.

FIG. 8 is a flow diagram of a method 800 for distributing electric power from a multi-phasic power source (e.g. the power source 300) to a plurality of electronic devices 130, the electric power being carried by a plurality of phases generated by the multi-phasic power source according to some examples of the present technology. In one or more aspects, the method 800 or one or more steps thereof may be performed by a processor or a computer system, in the present example by the controller 900. The method 800 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 800 begins, at step 805, with distributing electric power from the multi-phasic power source 300 to the power outlets 112. Each electronic device, such as the electronic device 130, is electrically connected to one of the power outlets 112. In this example, each multi-way switching devices 204A, 204B corresponds to a given electronic device 130 and distributes a present phase among the plurality of phases to the corresponding power outlet 112.

The method 800 continues, at step 810, with accessing for each power outlet, power consumption data comprising information about a power consumption of an electronic device electrically connected to the power outlet. In this example, the power consumption data is generated by the power sensing devices 114 and further transmitted to the controller 900.

The method 800 continues, at step 815, with determining, based on the power consumption data, a present degree of electrical imbalance of an electrical quantity of the multi-phasic power source. As previously described, the present degree of electrical imbalance is indicative of an imbalance between amounts of electric power consumed by the plurality of electronic devices on each one of the plurality of phases.

The method 800 then continues, at step 815, with executing a load balancing routine in response to the present degree of electrical imbalance being greater than a pre-determined threshold.

Upon executing the load balancing routine, the method 800 continues, at sub-step 817, with determining an adjusted phase to be distributed to at least one of the plurality of power outlets 112 by at least one multi-way switching device 204A, 204B of the plurality of multi-way switching devices 204A, 204B. In other words, the controller 900 may determine, for each electronic device 130, an adjusted phase to be distributed thereto in order to at least reduce the degree of electrical imbalance. In some examples, execution of the load balancing routine is periodically repeated. A period of time between two consecutive executions of the load balancing routine may be greater than a pre-determined time threshold in some examples. For example, said pre-determined time threshold may correspond to a loading time of the electronic devices 130 such that the electronic devices 130 are not disconnected from the power source before electronic components are not suitably recharged.

The method 800 further continues, at sub-step 819, with causing the multi-way switching device 204A, 204B to switch to an adjusted switching state in order to cause the at least one multi-way switching device 204A, 204B to select and distribute the adjusted phase to the corresponding power outlet 112. The electronic device 130 connected to said power outlet is thus provided with the adjusted phase.

In some examples, the method 800 includes detecting, by the controller 900, for each electronic device 130 and based on the sensor assembly 206 for example, at a moment in time (e.g. $T_1$ in the illustrative example of FIG. 4), a first zero-cross of an intensity or a voltage of a first phase, the first phase being relied upon to provide electric power to the electronic device 130. The controller 900 may further cause the multi-way switching device 204A, 204B to disconnect, at the first moment in time, the corresponding one of the plurality of power outlets 112 from the power source 300.

Subsequently, the method 800 may further include detecting, by the controller 900 at another moment in time (e.g. $T_2$ in the illustrative example of FIG. 4), a second zero-cross of an intensity or a voltage of the adjusted phase and cause, at the second moment in time, the multi-way switching device 204A, 204B to switch to the adjusted switching state to distribute the adjusted phase to the corresponding one of the plurality of power outlets 112. As such, the electronic device 130 is provided with the adjusted phase at $T_2$. In some examples, a difference between the first moment in time and the second moment in time is below the offline service time span of the electronic devices 130 (e.g. 16 ms).

In some other examples, the method 800 may further include detecting, by the controller 900, for each electronic device 130 and based on the sensor assembly 206 for example, at a given moment in time (e.g. $T_1$ in the illustrative example of FIG. 4), a first zero-cross of an intensity or a voltage of a first phase, the first phase being relied upon to provide electric power to the electronic device 130. The controller 900 may further cause the multi-way switching device 204A, 204B to disconnect, at the given moment in time, the corresponding one of the plurality of power outlets 112 from the power source 300.

Subsequently, the method 800 may further include detecting, by the controller 900 at another given moment in time (e.g. $T_2$ in the illustrative example of FIG. 4), a second zero-cross of an intensity or a voltage of a transitionary phase of the plurality of phases, the second zero-cross being an immediate zero-cross of an intensity or a voltage of any phase of the plurality of phases consecutive to the first zero-cross, and cause, at the $T_2$ moment in time, the multi-way switching device 204A, 204B to switch to a transitionary switching state to distribute the transitionary phase to the corresponding power outlet 112. As such, the electronic device 130 is provided with the transitionary phase that may not be the adjusted phase. In some examples, the load balancing routine is repeated until the multi-way switching device 204A, 204B distributes the adjusted phase to the corresponding power outlet 112.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Figure 9:
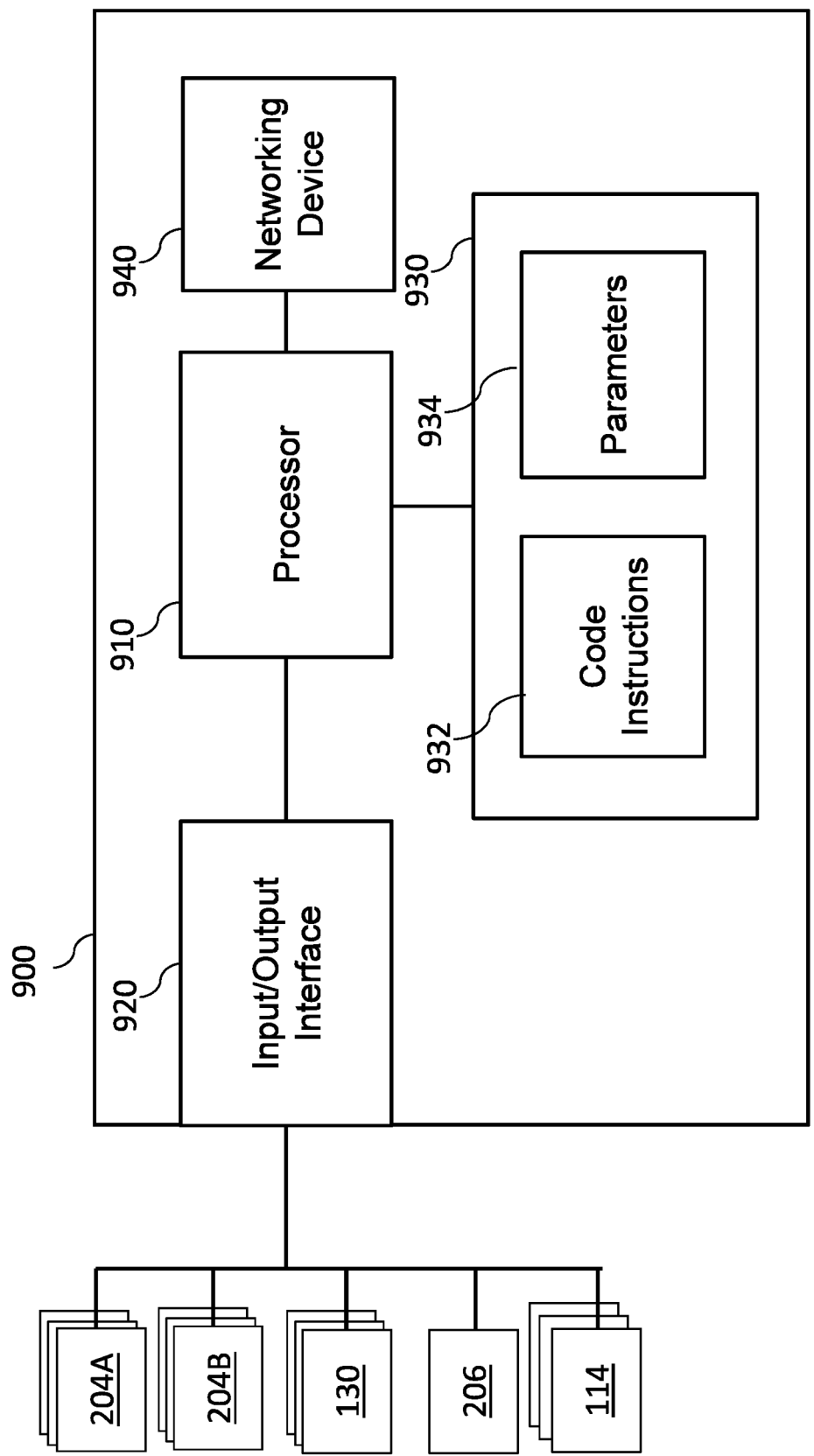
FIG. 9 is a block diagram of a controller in accordance with an example of the present technology.

As an example, FIG. 9 is a schematic block diagram of the controller 900 of the PDU 100 according to an example of the present technology. The controller 900 includes a processor or a plurality of cooperating processors (represented as a processor 910 for simplicity), a memory device or a plurality of memory devices (represented as a memory device 930 for simplicity), and an input/output interface 920 allowing the controller 900 to communicate with other components of the PDU 100 and/or other components in communication with the PDU 100 such as the electronic devices 130. The processor 910 is operatively connected to the memory device 930 and to the input/output interface 920. The memory device 930 includes a storage for storing parameters 934, including for example and without limitation the above-mentioned pre-determined threshold for the degree of electrical imbalance. The memory device 930 may comprise a non-transitory computer-readable medium for storing code instructions 932 that are executable by the processor 910 to allow the controller 900 to perform the various tasks allocated to the controller 900 in the method 800.

The controller 900 is operatively connected, via the input/output interface 920, to the switching devices 202A, 202B, the multi-way switching devices 204A, 204B, the sensor 206 and the power sensing devices 114. The controller 900 executes the code instructions 932 stored in the memory device 930 to implement the various above-described functions that may be present in a particular example. FIG. 9 as illustrated represents a non-limiting example in which the controller 900 orchestrates operations of the switching modules 204A and 204B. This particular example is not meant to limit the present disclosure and is provided for illustration purposes.

It is to be understood that the operations and functionality of the described PDU 100, its constituent components, and associated processes may be achieved by any one or more of hardware-based, software-based, and firmware-based elements. Such operational alternatives do not, in any way, limit the scope of the present disclosure.

It should be expressly understood that not all technical effects mentioned herein need to be enjoyed in each and every example of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for distributing electric power in a datacenter rack assembly from a multi-phasic power source to a plurality of rack-mounted electronic devices, the electric power being carried by a plurality of phases generated by the multi-phasic power source, the method comprising:
   monitoring, by a sensor assembly directly connected to the multi-phasic power source, initial operational phase parameter data of each phase generated by the multi-phasic power source, the initial operational phase parameter data including one or more of frequency, amplitude, offsets, and zero crossings of intensity or voltage parameters;
   distributing, via a plurality of multi-way switching devices, mono-phasic electric power from the multi-phasic power source to a plurality of power outlets that are each electrically connected to one of the plurality of rack-mounted electronic devices, each multi-way switching device corresponding to a given rack-mounted electronic device and being configured to distribute a present phase among the plurality of phases to the corresponding power outlet;
   accessing, for each power outlet, power consumption data comprising information about a power consumption of a corresponding rack-mounted electronic device;
   determining, based on the power consumption data and the initial operational phase parameter data of the sensor assembly, a present degree of electrical imbalance of an electrical quantity of the multi-phasic power source, the present degree of electrical imbalance being indicative of an imbalance between amounts of electric power consumed by the plurality of rack-mounted electronic devices on each one of the plurality of phases; and
   in response to the determined present degree of electrical imbalance being greater than a pre-determined threshold, executing a load balancing routine comprising:
   determining an adjusted phase to be distributed to at least one of the plurality of power outlets by at least one multi-way switching device of the plurality of multi-way switching devices;
   detecting a first zero-cross of one of an intensity and a voltage of a first phase of the plurality of phases, the first phase being relied upon to provide electric power to the electronic device corresponding to the at least one multi-way switching device;
   causing, in response to detecting the first zero-cross, the at least one multi-way switching device to disconnect a power outlet, of the plurality of power outlets, that corresponds to the at least one multi-way switching device;
   detecting a second zero-cross of one of an intensity and a voltage of the adjusted phase; and
   causing, in response to detecting the second zero-cross, the at least one multi-way switching device to switch to an adjusted switching state to distribute the adjusted phase to the power outlet, of the plurality of power outlets, that corresponds to the at least one multi-way switching device.

2. A method for distributing electric power in a datacenter rack assembly from a multi-phasic power source to a plurality of rack-mounted electronic devices, the electric power being carried by a plurality of phases generated by the multi-phasic power source, the method comprising:
monitoring, by a sensor assembly directly connected to the multi-phasic power source, initial operational phase parameter data of each phase generated by the multi-phasic power source, the initial operational phase parameter data including one or more of frequency, amplitude, offsets, and zero crossings of intensity or voltage parameters;
distributing, via a plurality of multi-way switching devices, mono-phasic electric power from the multi-phasic power source to a plurality of power outlets that are each electrically connected to one of the plurality of rack-mounted electronic devices, each multi-way switching device corresponding to a given rack-mounted electronic device and being configured to distribute a present phase among the plurality of phases to the corresponding power outlet;
accessing, for each power outlet, power consumption data comprising information about a power consumption of a corresponding rack-mounted electronic device;
determining, based on the power consumption data and the initial operational phase parameter data of the sensor assembly, a present degree of electrical imbalance of an electrical quantity of the multi-phasic power source, the present degree of electrical imbalance being indicative of an imbalance between amounts of electric power consumed by the plurality of rack-mounted electronic devices on each one of the plurality of phases;
in response to the determined present degree of electrical imbalance being greater than a pre-determined threshold, executing a load balancing routine comprising:
determining an adjusted phase to be distributed to at least one of the plurality of power outlets by at least one multi-way switching device of the plurality of multi-way switching devices; detecting a first zero-cross of one of an intensity and a voltage of the present phase;
causing, in response to detecting the first zero-cross, the at least one multi-way switching device to disconnect, a power outlet, of the plurality of power outlets, that corresponds to the at least one multi-way switching device;
detecting a second zero-cross of one of an intensity and a voltage of a transitionary phase of the plurality of phases, the second zero-cross being an immediate zero-cross of one of an intensity and a voltage of any phase of the plurality of phases consecutive to the first zero-cross; and
causing in response to detecting the second zero-cross, the at least one multi-way switching device to switch to a transitionary switching state to distribute the transitionary phase to the power outlet, of the plurality of power outlets, that corresponds to the at least one multi-way switching device.

3. The method of claim 2, further comprising:
repeating the load balancing routine; and
terminating the repeating the load balancing routine in response to the at least one multi-way switching device distributing the adjusted phase to the power outlet, of the plurality of power outlets, that corresponds to the at least one multi-way switching device.

4. The method of claim 1, further comprising repeating the load balancing routine periodically.

5. The method of claim 4, wherein a period of time between two consecutive executions of the load balancing routine is greater than a pre-determined time threshold.

6. A non-transitory computer-readable medium comprising computer-readable instructions that, upon being executed by a datacenter system comprising a controller, a multi-phasic power source, a plurality of rack-mounted electronic devices coupled to a respective power outlet, and a plurality of multi-way switching devices each corresponding to a given rack-mounted electronic device, cause the datacenter system controller to perform the method of claim 1.

7. A datacenter rack assembly power distribution unit for distributing electric power from a multi-phasic power source to a plurality of rack-mounted electronic devices, the power distribution unit comprising:
a controller;
a power inlet for receiving electric power from the multi-phasic power source, electric power being carried by a plurality of phases generated by the multi-phasic power source;
a sensor assembly, directly connected to the power inlet and the controller, that is configured to monitor initial operational phase parameter data of each phase generated by the multi-phasic power source, the operational phase parameter data including one or more of frequency, amplitude, offsets, and zero crossings of intensity or voltage parameters;
a plurality of power outlets for distributing mono-phasic electric power to the plurality of rack-mounted electronic devices, each power outlet comprising:
a power sensing device communicably connected to the controller, the power sensing device being configured to determine power consumption data corresponding to a power consumption of a corresponding electronic device of the plurality of rack-mounted electronic devices electrically connected to the power outlet and transmit said power consumption data to the controller; and
a plurality of multi-way switching devices operatively connected between the power inlet and the plurality of power outlets, the plurality of multi-way switching devices being communicably connected to the controller, each multi-way switching device being configured to distribute a given phase of the plurality of phases to a corresponding power outlet for generating mono-phasic electric power for the corresponding power outlet;
wherein the controller is configured to execute a load balancing routine comprising:
determining, based on the power consumption data received from the power sensing device of each of the plurality of power outlets and the initial operational phase parameter data of the sensor assembly, a present degree of electrical imbalance of the multi-phasic power source, the present degree of electrical imbalance being indicative of an amount of electric power consumed by the plurality of rack-mounted electronic devices on each of the plurality of phases;
determining, in response to the determined present degree of electrical imbalance being greater than a pre-determined threshold, an adjusted phase to be distributed to at least one of the plurality of power outlets by at least one corresponding multi-way switching device of the plurality of multi-way switching devices;

detecting a first zero-cross of one of an intensity and a voltage of a first phase of the plurality of phases, the first phase being relied upon to provide electric power to a power outlet, of the plurality of power outlets, that corresponds to the at least one multi-way switching device;

causing, in response to detecting the first zero-cross, the at least one multi-way switching device to disconnect, the power outlet, of the plurality of power outlets, that corresponds to the at least one multi-way switching device;

detecting a second zero-cross of one of an intensity and a voltage of the adjusted phase; and causing, in response to detecting the second zero-cross, the at least one multi-way switching device to switch to an adjusted switching state to distribute the adjusted phase to the power outlet, of the plurality of power outlets, that corresponds to the at least one multi-way switching device.

8. The power distribution unit of claim 7, wherein the controller is further configured to, for the at least one multi-way switching device:

detect a second zero-cross of a transitionary phase, the second zero-cross being an immediate zero-cross of any phase of the plurality of phases consecutive to the first zero-cross; and cause in response to the second zero-cross of the transitionary phase, the at least one multi-way switching device to switch to a transitionary switching state to distribute the transitionary phase to the power outlet, of the plurality of power outlets, that corresponds to the at least one multi-way switching device.

9. The power distribution unit of claim 8, wherein the controller is configured to:

repeat an execution of the load balancing routine; and end the repeating the execution of the load balancing routine in response to the at least one multi-way switching device distributing the adjusted phase to the power outlet, of the plurality of power outlets, that corresponds to the at least one multi-way switching device.

10. The power distribution unit of claim 7, wherein the controller is configured to execute the load balancing routine periodically.

11. The power distribution unit of claim 7, further comprising a plurality of inlet phase sensing devices for sensing an electric power of each phase of the multi-phasic power source at the power inlet.

12. The power distribution unit of claim 11, wherein the controller is configured to execute the load balancing routine in response to at least one of the plurality of inlet phase sensing devices detecting a loss of at least one phase of the multi-phasic power source.

13. The power distribution unit of claim 7, wherein the power inlet is configured to receive a tri-phasic electric power from a tri-phasic power source.

14. The method of claim 2, further comprising repeating the load balancing routine periodically.

15. The method of claim 14, wherein a period of time between two consecutive executions of the load balancing routine is greater than a pre-determined time threshold.

16. A non-transitory computer-readable medium comprising computer-readable instructions that, upon being executed by a datacenter system comprising a controller, a multi-phasic power source, a plurality of rack-mounted electronic devices coupled to a respective power outlet, and a plurality of multi-way switching devices each corresponding to a given rack-mounted electronic device, cause the datacenter system controller to perform the method of claim 3.

17. The method of claim 1, further comprising receiving, by a power inlet, a tri-phasic electric power from a tri-phasic power source.

18. The power distribution unit of claim 10, wherein a period of time between two consecutive executions of the load balancing routine is greater than a pre-determined time threshold.

\* \* \* \* \*

UNITED STATES PATENT AND TRADEMARK OFFICE
CERTIFICATE OF CORRECTION

| | | |
|---|---|---|
| PATENT NO. | : 12,355,249 B2 | Page 1 of 1 |
| APPLICATION NO. | : 18/237177 | |
| DATED | : July 8, 2025 | |
| INVENTOR(S) | : Christophe Maurice Thibaut et al. | |

It is certified that error appears in the above-identified patent and that said Letters Patent is hereby corrected as shown below:

In the Claims

Column 21, Claim 2, Line 24 should read --to the corresponding power outlet;--

Column 21, Claim 2, Line 56 should read --causing, in response to detecting the second zero-cross, the--

Column 23, Claim 8, Lines 29-30 should read --cause, in response to the second zero-cross of the transitionary phase, the at least one multi-way switching--

Signed and Sealed this
Second Day of September, 2025

Coke Morgan Stewart
*Acting Director of the United States Patent and Trademark Office*